UNITED STATES PATENT OFFICE.

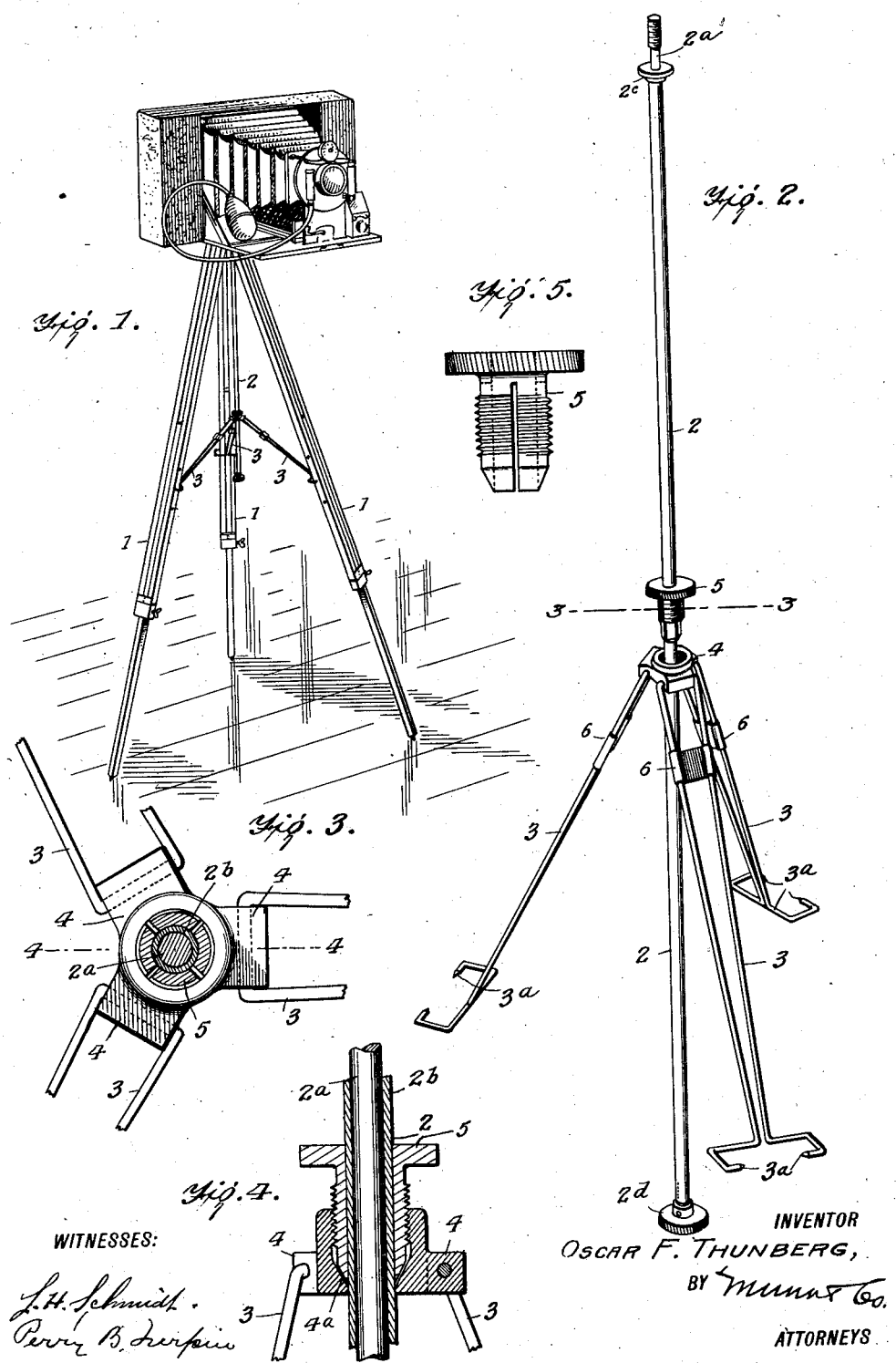

OSCAR FEYVEN THUNBERG, OF SEATTLE, WASHINGTON.

TRIPOD ATTACHMENT.

1,022,983.  Specification of Letters Patent.  Patented Apr. 9, 1912.

Application filed September 13, 1910. Serial No. 581,858.

*To all whom it may concern:*

Be it known that I, OSCAR FEYVEN THUNBERG, a citizen of the United States, and a resident of Seattle, in the county of King and State of Washington, have invented certain Improvements in Tripod Attachments, of which the following is a specification.

My invention is an improved means for bracing and adjustably connecting the legs of a camera, or other tripod.

The details of construction, arrangement, and operation of parts are as hereinafter described, and illustrated in the accompanying drawing, in which:—

Figure 1 is a perspective view of a photographic camera and tripod provided with my improved attachment. Fig. 2 is a perspective view of the attachment disconnected from other parts. Fig. 3 is a horizontal section on the line 3—3 of Fig. 2. Fig. 4 is a vertical section on the line 4—4 of Fig. 3. Fig. 5 is a side view of the split and tapered clamp-screw.

In Fig. 1, the numeral 1 indicates extensible legs such as are well-known and commonly used to form a tripod support for photographic cameras, surveying instruments, and the like.

My improved attachment comprises a pendent part 2, which, for convenience, I will term a rod; arms 3, a head or casting 4, adapted to slide on the rod and provided with a screw-threaded socket, and a clamp-screw 5 adapted to engage said socket.

The rod 2 comprises a solid inner stem $2^a$ and an outer or surrounding sleeve $2^b$—see Fig. 4. The upper projecting end of the stem is threaded to provide for convenient attachment to the head of the tripod, and a loose collar $2^c$ is arranged adjacently and supported on the top of the sleeve $2^b$. A milled head $2^d$ is applied to the lower end of the stem for convenience in rotating it.

The arms 3 are composed of a spring wire or rod doubled upon itself and pivoted to projecting portions or lugs of the slidable, socketed head 4. The outer ends of the arms are bent laterally outward and then inward and provided with points $3^a$ which are adapted to enter holes in the legs 1 of the tripod.

As shown in Fig. 2, the portions of the rod composing the body of each arm incline toward each other, or converge, from the inner end outward. A metal tie 6 is applied to each of the arms and adapted to slide on the rod composing the same. By adjusting the tie toward or from the slidable head 4, the points $3^a$ of the arms may be opened more widely or brought closer together. When the tie is adjusted toward the points $3^a$, they will be separated so as to release them from engagement with the legs 1; but when the tie is slid toward the head 4, the parts composing the arms will be brought nearer each other, and the points $3^a$ will be caused to engage or bite into the legs 1 and thus take a firm hold thereon. It is thus apparent that the arms may be quickly applied to, or detached from, the legs, as occasion may require, and the whole attachment may be quickly applied to or removed from the head of the tripod by unscrewing the stem $2^a$.

By means of the tapered and split screw 5, the head 4 to which the several arms and braces 3 are attached may be quickly clamped at any desired height on the rod 2. As shown, the screw 5 has an enlarged, milled head or flange, and its body is screw-threaded, while its lower portion is divided or split lengthwise, and also made in conical form. By such splits or divisions, the lower end of the screw is provided with a series of spring fingers. The head 4 is provided with a socket which is screw-threaded internally at the upper end and is made conical in the lower portion, as shown at $4^a$ in Fig. 4. Thus, when the screw 5 is screwed down into the socket, as shown in Fig. 4, the spring fingers composing the conical point will be forced inward by contact with the tapered lower portion of the socket, and thus caused to clamp tightly upon the sleeve $2^b$ which forms a portion of the pendent rod 2.

The clamp-screw 5 bites on the sleeve $2^b$, thus leaving the stem or solid rod $2^a$ free to rotate independently of the sleeve so that the camera proper may be turned right or left while the tripod proper remains stationary.

In Fig. 2, the screw 5 is shown raised above the head 4, and thus the latter is left free to be slid up or down on the rod. The screw works easily on the rod, and may, therefore, be quickly adjusted up or down to engage it with or disengage it from the socket, and thus clamp or unclamp the arms 3, as occasion may require.

It will be seen that my improved attachment enables the legs of the tripod to be quickly and easily adjusted toward or from each other and to be clamped most securely in the desired position. The legs being also extensible, it is apparent that the tripod may be set on very uneven ground. Furthermore, the ties or braces composed of the arms 3 connect and brace the legs at such a point as to prevent any vibration due to their length, so that the camera or other instrument is supported with great steadiness.

What I claim is:—

1. The improved tripod attachment comprising a pendent rod, a head which is slidable thereon, and means for securing it in any adjustment, arms pivoted to said head and formed at their outer ends as jaws adapted to engage the legs of a tripod, and means for adjusting the jaws to open or close the same, substantially as described.

2. The improved attachment comprising a pendent rod, a head slidable thereon, means for securing it in any adjustment, and arms pivoted to the head and formed of spring rods whose outer ends are formed as jaws adapted to engage the legs of a tripod, substantially as described.

3. The improved tripod attachment comprising a pendent rod, a head which is slidable thereon and provided with a threaded socket which is conical in its lower portion, arms pivoted to said head and adapted to engage the legs of the tripod, and a clamp screw adapted to slide on the rod and having its body screw-threaded and its lower portion slit or divided lengthwise from the bottom up and made in conical form, whereby the screw is adapted to engage the socket and to clamp the rod in the manner described.

4. In a tripod attachment, the combination with a pendent rod, and a head slidable thereon, of arms pivoted to the head and formed of spring rods having their outer ends bent laterally and then inward to form clamping jaws, and a device applied to each arm and adapted to slide thereon for adjusting the jaws nearer to or farther from each other, so as to bite or release the legs of a tripod, substantially as described.

5. The combination with a camera tripod, of an attachment comprising a solid stem having its upper end screw-threaded, a sleeve applied to such stem, a nonrotatable head applied to the lower end of the stem, and means for connecting the tripod legs with the sleeve, the same consisting of a head adapted to slide on said sleeve, means for clamping it in any desired adjustment, and arms pivoted to the head and adapted for detachable connection with the tripod legs, substantially as described.

OSCAR FEYVEN THUNBERG.

Witnesses:
   GEORGE F. HANNAN,
   HILDA REGINA UNLAND.

Copies of this patent may be obtained for five cents each, by addressing the "Commissioner of Patents, Washington, D. C."